United States Patent
Lee et al.

(10) Patent No.: US 12,463,281 B2
(45) Date of Patent: Nov. 4, 2025

(54) VEHICLE BATTERY PACK ASSEMBLY

(71) Applicants: Hyundai Motor Company, Seoul (KR); Kia Corporation, Seoul (KR)

(72) Inventors: Kang Won Lee, Seongnam-si (KR); Jeong Hun Seo, Suwon-si (KR); In Gook Son, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 665 days.

(21) Appl. No.: 17/888,903

(22) Filed: Aug. 16, 2022

(65) Prior Publication Data

US 2023/0198072 A1    Jun. 22, 2023

(30) Foreign Application Priority Data

Dec. 17, 2021    (KR) .......................... 10-2021-0181676

(51) Int. Cl.
   *H01M 50/249*    (2021.01)
   *H01M 50/209*    (2021.01)
   *H01M 50/262*    (2021.01)
   *H01M 50/291*    (2021.01)

(52) U.S. Cl.
   CPC ....... *H01M 50/249* (2021.01); *H01M 50/209* (2021.01); *H01M 50/262* (2021.01); *H01M 50/291* (2021.01); *H01M 2220/20* (2013.01)

(58) Field of Classification Search
   CPC ............. H01M 50/249; H01M 50/209; H01M 50/262; H01M 50/291; H01M 2220/20; H01M 50/244; H01M 10/0481; H01M 50/204; H01M 50/224; H01M 50/242; H01M 50/264; H01M 50/271; H01M 50/258; B60K 1/04; Y02E 60/10
   See application file for complete search history.

(56) References Cited

U.S. PATENT DOCUMENTS

| | | | |
|---|---|---|---|
| 2017/0214012 A1* | 7/2017 | Benedict | H01M 10/0481 |
| 2020/0212387 A1* | 7/2020 | Su | H01M 10/0413 |
| 2022/0045386 A1* | 2/2022 | Jo | H01M 50/30 |
| 2022/0185088 A1* | 6/2022 | Zhang | H01M 50/264 |
| 2022/0328900 A1* | 10/2022 | Koepele | H01M 50/249 |
| 2023/0092616 A1* | 3/2023 | Lee | H01M 50/204 |
| | | | 429/72 |

FOREIGN PATENT DOCUMENTS

KR    10-2013-0142854 A    12/2013

* cited by examiner

*Primary Examiner* — Michael L Dignan
(74) *Attorney, Agent, or Firm* — Morgan, Lewis & Bockius LLP

(57) ABSTRACT

A vehicle battery pack assembly includes a battery module including a plurality of battery cells stacked and provided in a transverse direction, and an endplate provided at an outermost side of the battery module in a width direction of the battery module and formed with a mounting portion protruding outward therefrom; and a battery casing provided with a casing member extending along a longitudinal direction of the battery module, the casing member, of which a surface facing toward the battery module is in surface-contact with the endplate to support a surface pressure of the battery module, wherein the casing member includes a fastening groove formed at a point corresponding to the mounting portion, wherein the mounting portion is inserted in the fastening groove and fastened to the casing member.

14 Claims, 6 Drawing Sheets

VEHICLE BATTERY PACK ASSEMBLY

CROSS REFERENCE TO RELATED APPLICATION

The present application claims priority to Korean Patent Application No. 10-2021-0181676, filed Dec. 17, 2021, the entire contents of which is incorporated herein for all purposes by this reference.

BACKGROUND OF THE PRESENT DISCLOSURE

Field of the Present Disclosure

The present disclosure relates to a vehicle battery pack assembly, and more particularly, to a vehicle battery pack assembly, in which a battery pack casing member itself forms a structure for supporting the surface pressure of a large-area module from the front without a separate pack endplate in a battery assembly using a cell-to-pack (CTP) structure to thereby strongly support the surface pressure, the use of the battery pack casing member makes the battery pack assembly lightweight and reduces the costs of materials, and a battery pack itself is improved in stability.

Description of Related Art

Hybrid electric vehicles, fuel cell vehicles, and electric vehicles all employ an electric motor to operate, and essentially require a high-voltage battery pack for supplying driving power to the electric motor.

Battery cells forming a battery module are stacked and provided with endplates placed at both end portions and generate surface pressure due to the endplates during charging and discharging. Therefore, a conventional battery system utilizes a separate pack endplate for supporting the surface pressure.

To support the high surface pressure of the battery module, a conventional pack endplate is mounted to a casing member of the battery pack, and essentially needs bolting hardware for the mounting. Furthermore, in a cell-to-pack (CTP) structure, the large area of the battery module increases the number of battery cells mounted to the battery pack, causing the surface pressure to be higher than that of the conventional battery module.

Accordingly, the bolting hardware for supporting the high surface pressure increases, having problems in that the weight of the battery pack assembly increases and the costs of materials is increased.

Recently, a structure has emerged, in which a battery pack casing member supports the surface pressure of the large-area module from the front without a separate pack endplate.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a battery pack casing member itself structured to support the surface pressure of a large-area module from the front without a separate pack endplate in a battery assembly using a cell-to-pack (CTP) structure to support the surface pressure thereby strongly, the use of the battery pack casing member makes the battery pack assembly lightweight and reduces the costs of materials, and a battery pack itself has improved stability.

According to an aspect of the present disclosure, a vehicle battery pack assembly includes: a battery module including a plurality of battery cells stacked and provided in a transverse direction, and an endplate provided at an outermost side of the battery module in a width direction of the battery module and formed with a mounting portion protruding outward therefrom; and a battery casing provided with a casing member extending along a longitudinal direction of the battery module, the casing member, of which a surface facing toward the battery module is in surface-contact with the endplate to support a surface pressure of the battery module, wherein the casing member includes a fastening groove formed at a point corresponding to the mounting portion, wherein the mounting portion is inserted in the fastening groove and fastened to the casing member.

A compression pad may be provided between the battery cells to compensate for a space caused by the contract and expansion of the battery cells.

The casing member may include side members provided at opposite sides of the battery casing in the longitudinal direction, a middle member provided between the side members in the longitudinal direction, and crossing members provided between the side members and the middle member in the transverse direction, and the battery module may be provided and provided in a lateral direction with respect to the middle member between the side members.

The side, middle, and crossing members may support the battery module in the lateral direction.

The casing member may include an extruding member, a cross-section of which includes a plurality of hollow portions.

The plurality of hollow portions may include an upper space and a lower space, which are divided by an intermediate wall provided between the upper space and the lower space.

The fastening groove may be formed in the intermediate wall and corresponds to the mounting portion, and the mounting portion may be vertically inserted in the fastening groove and fastened to the casing member.

The mounting portion may support both the endplate and the intermediate wall when inserted in the fastening groove and fastened to the casing member.

The fastening groove may include a plurality of fastening grooves formed in the casing member and spaced apart at predetermined intervals, and the mounting portions may be respectively inserted in the fastening grooves and fastened to the casing member.

The mounting portion may be inserted in the fastening groove and fastened to the casing member by bolting.

The mounting portion may be formed at a middle point of the endplate with respect to a height of the battery module.

A portion in the casing member, to which the mounting portion inserted in the fastening groove is fastened, may be formed at a same height as the mounting portion, and a portion in the casing member, in which the mounting portion is not inserted and fastened to the fastening groove, may be formed at the same height as the battery module.

A lateral surface of a lower space may be in surface-contact with the endplate and supports the surface pressure of the battery module in a portion in the casing member, to which the mounting portion inserted in the fastening groove is fastened, and lateral surfaces of an upper space and the lower space may be in surface-contact with the end plate and supports the surface pressure of the battery module in a portion in the casing member, in which the mounting portion is not inserted in and not fastened to the fastening groove.

In the vehicle battery pack assembly according to the present disclosure, the battery pack casing member itself is structured to support the surface pressure of the large-area module from the front without the separate pack endplate in the battery assembly using the CTP structure to support the surface pressure thereby strongly, the use of the battery pack casing member makes the battery pack assembly lightweight and reduces the costs of materials, and the battery pack itself is improved in stability.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
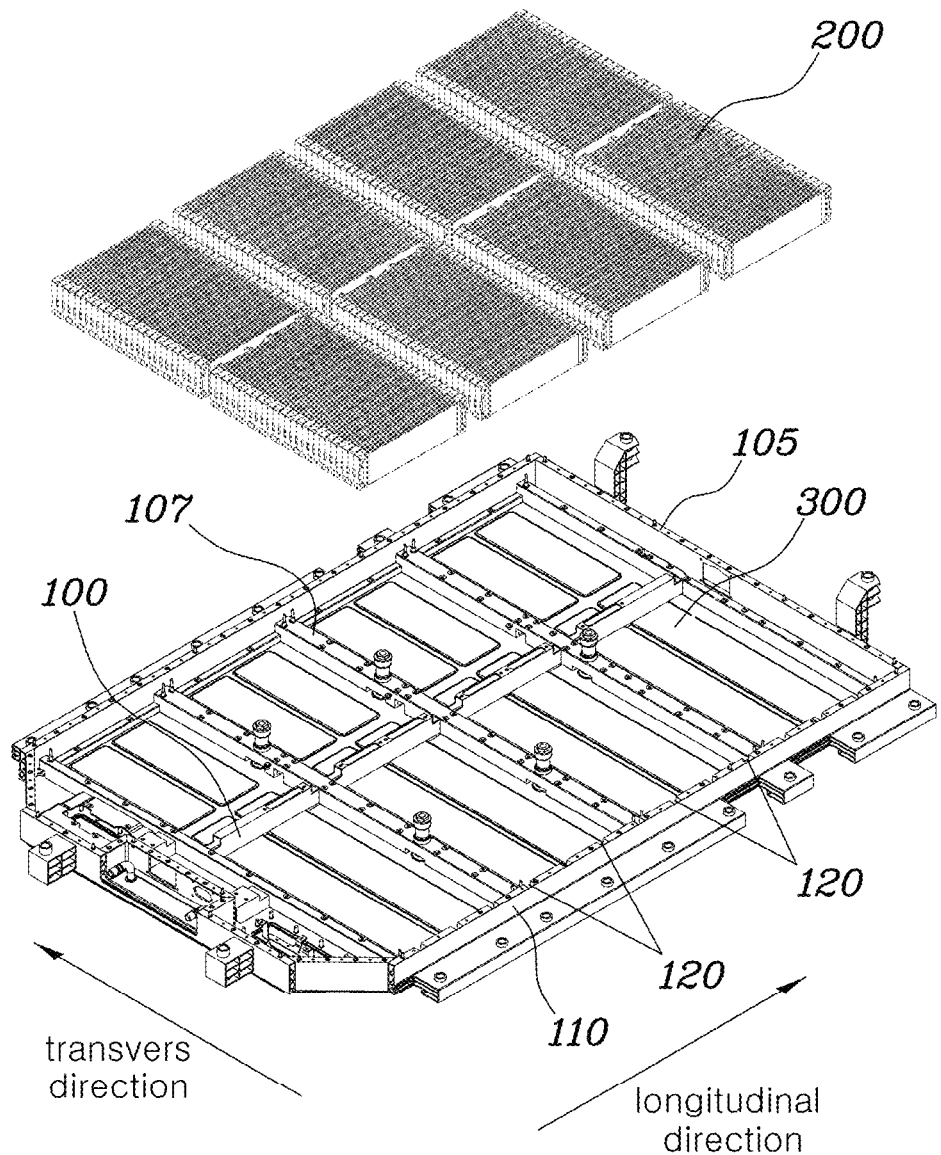
FIG. 1 is a view showing a vehicle battery pack assembly according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Regarding embodiments of the present disclosure included in the exemplary embodiment or application, the specific structural or functional description is merely illustrative for describing the embodiments of the present disclosure, and embodiments of the present disclosure may be implemented in various forms but not be construed as being limited to the embodiments set forth in the exemplary embodiment or application.

Because the embodiments of the present disclosure may be variously modified and have various forms, specific exemplary embodiments will be illustrated in the drawings and described in detail in the exemplary embodiment or application. However, it should be understood that embodiments of the present disclosure are intended not to be limited to the specific embodiments but to cover all modifications, equivalents or alternatives without departing from the spirit and technical scope of the present disclosure.

Unless defined otherwise, all terms used herein including technical or scientific terms have the same meanings as those generally understood by a person having ordinary knowledge in the art to which the present disclosure pertains. The terms such as those defined in generally used dictionaries are construed to have meanings matching that in the context of related technology, and unless clearly defined otherwise, are not construed to be ideally or excessively formal.

Below, the present disclosure will be described in detail by describing embodiments with reference to the accompanying drawings. Like reference numerals in the drawings refer to like numerals.

Figure 2:
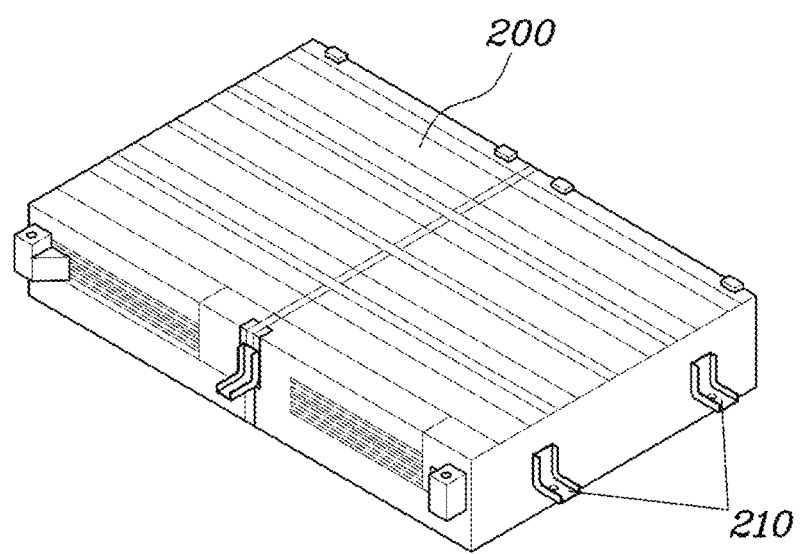
FIG. 2 is a view showing a battery module, and a mounting portion formed in the battery module in a vehicle battery pack assembly.
Figure 3:
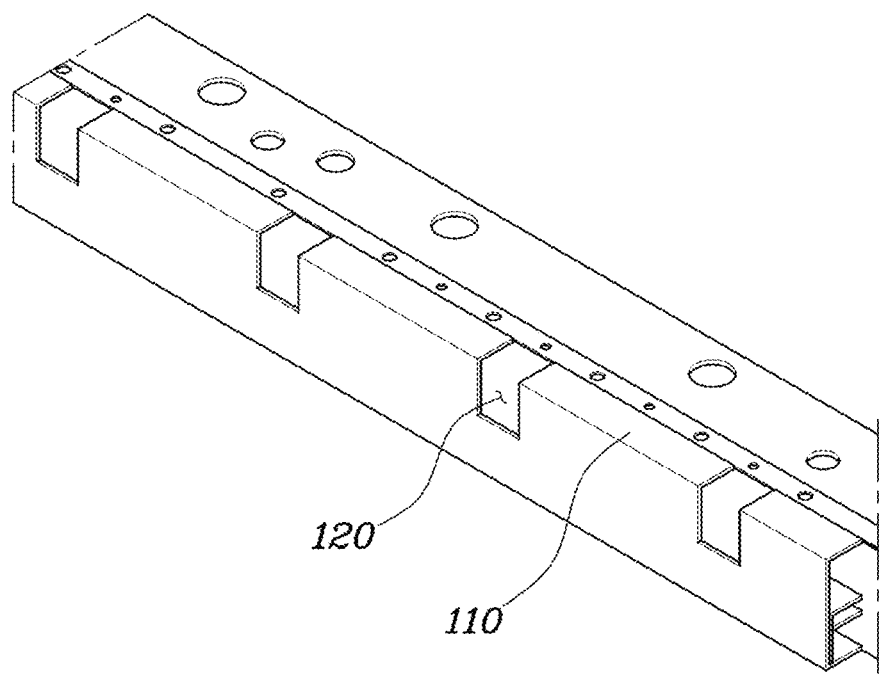
FIG. 3 is a view showing a casing member in a vehicle battery pack assembly.
Figure 4:
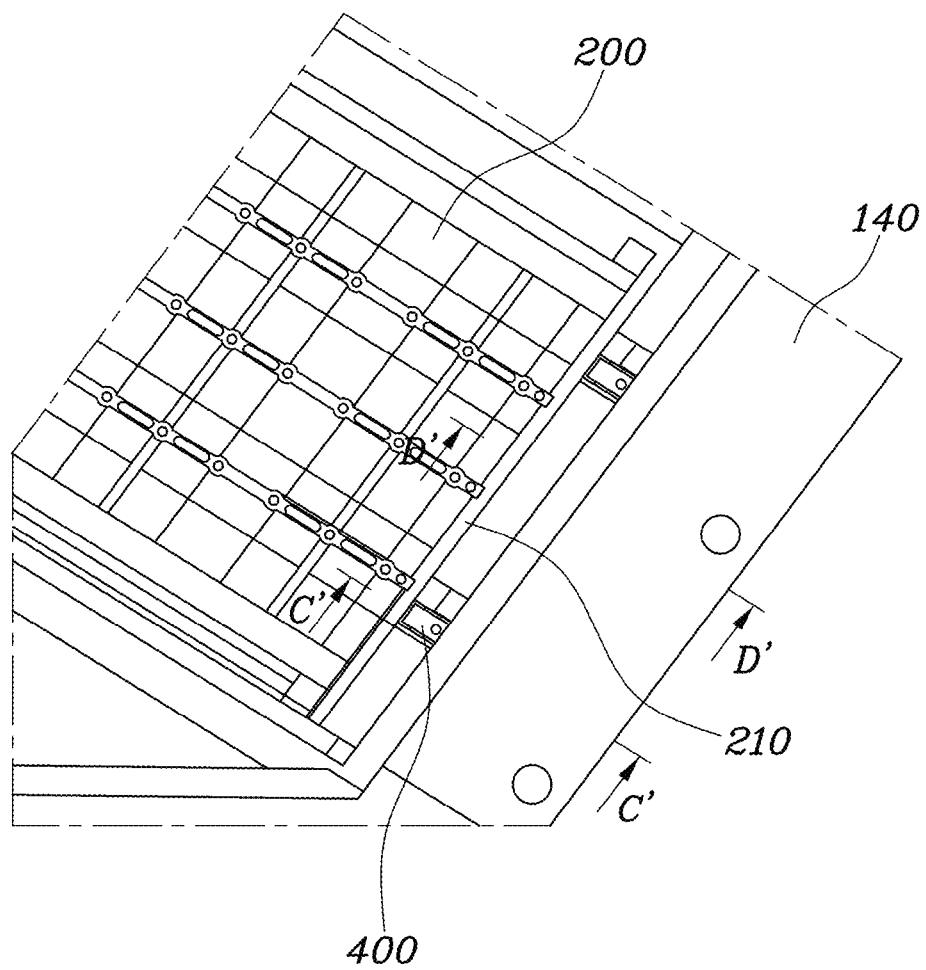
FIG. 4 is a view showing that a surface of a casing member, which faces a battery module, is in surface-contact with an endplate to support the surface pressure of the battery module.
Figure 5:
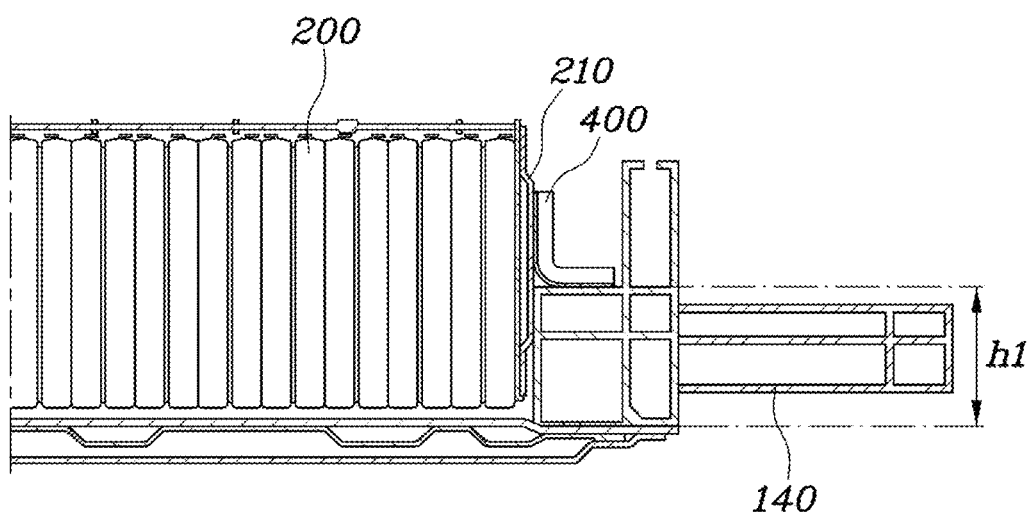
FIG. 5 and FIG. 6 are views showing a cross section taken along line C', in which a mounting portion is inserted in and fastened to a fastening groove in a casing member, and a cross-section taken along line D', in which the mounting portion is not inserted in and not fastened to the fastening groove.
Figure 6:
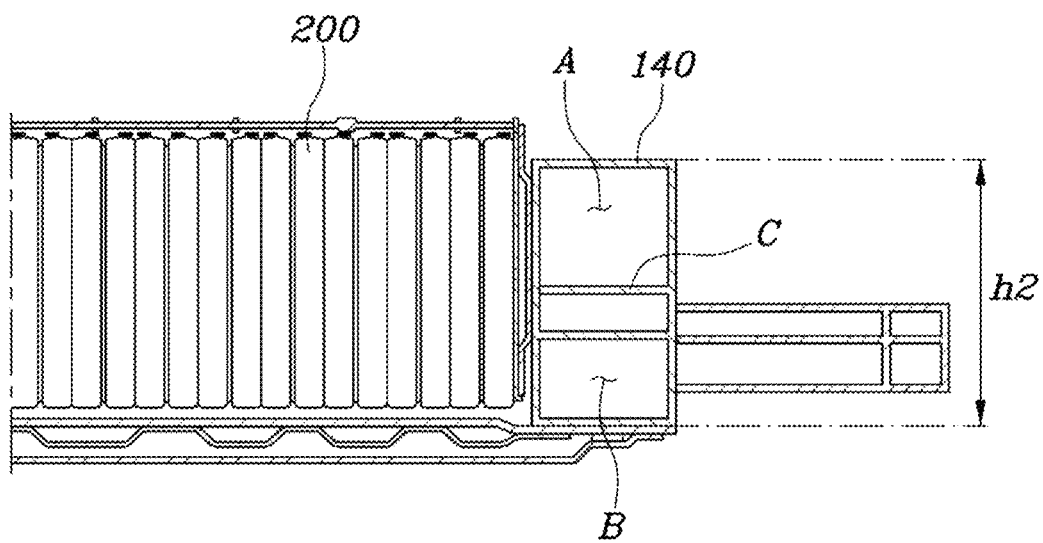

FIG. 1 is a view showing a vehicle battery pack assembly according to an exemplary embodiment of the present disclosure. FIG. 2 is a view showing a battery module, and a mounting portion formed in the battery module in the vehicle battery pack assembly. FIG. 3 is a view showing a casing member 105 in the vehicle battery pack assembly. FIG. 4 is a view showing that the surface of the casing member 105, which faces the battery module, is in surface-contact with an endplate to support the surface pressure of the battery module. FIG. 5 and FIG. 6 are views showing a cross-section taken along line C', in which the mounting portion is inserted in and fastened to a fastening groove in the casing member 105, and a cross-section taken along line D', in which the mounting portion is not inserted in and not fastened to the fastening groove.

FIG. 1 is a view showing a vehicle battery pack assembly according to an exemplary embodiment of the present disclosure.

Referring to FIG. 1, the vehicle battery pack assembly includes a battery module 200 including a plurality of battery cells, which are stacked and provided in a transverse direction, and an endplate 210 provided at an outermost side in a width direction and formed with a mounting portion 400 protruding outward; and a battery casing 300 provided with a casing member 105 extending along a longitudinal direction, the casing member 105, of which a surface facing toward the battery module 200 is in surface-contact with the endplate 210 to support the surface pressure of the battery module 200, including a fastening groove 120 formed at a point corresponding to the mounting portion 400, so that the mounting portion 400 may be inserted in the fastening groove 120 and fastened to the casing member 105.

According to the present disclosure, the battery pack casing member 105 itself is structured to support the surface pressure of a large-area module from the front without separately using the pack endplate 210 in the battery assembly using a CTP structure to thereby strongly support the surface pressure of the battery module 200. In a battery, a plurality of cells is mounted into a module, and the modules are mounted into a pack.

CTP is the abbreviation for a cell to pack and refers to technology in which the battery cells are designed to directly lead to the battery pack without the battery module 200. The CTP structure has the advantage of predominating over a pouch-type battery because energy density increases by securing more space inside the battery pack, and costs are reduced by decreasing the number of parts.

However, the CTP structure has problems in that the weight of the battery pack assembly and the costs of materials are increased as the number of battery cells mounted to the battery pack increases due to the large area of the battery module 200, the surface pressure higher than that of the preexisting battery module is generated, and thus bolting hardware increases to support the high surface pressure.

To solve these problems, a vehicle battery pack assembly according to the present disclosure is provided to include the casing member 105 being in surface-contact with the endplate 210 and thus directly supporting the surface pressure of the battery module 200 to strongly support the high surface pressure in the CTP structure.

The battery module 200 includes the plurality of battery cells, which are stacked and provided in the transverse direction, and the endplate 210 provided at an outermost side in a width direction and formed with the mounting portion 400 protruding outward.

Referring to FIG. 1, the casing member 105 includes side members 110 provided at opposite sides of the battery casing 300 in the longitudinal direction, a middle member 100 provided between the side members 110 in the longitudinal direction, and crossing members 107 provided between the side member 110 and the middle member 100 in the transverse direction, in which the battery module 200 is provided in a lateral direction with respect to the middle member 100 between the side members 110.

The side member 110 and the middle member 100 of the casing member 105 are generally provided in a longitudinal direction of a vehicle, and form a vehicle body together with the crossing members 107 intersecting the side member 110 and the middle member 100.

Furthermore, the side member 110, the middle member 100 and the crossing members 107 may support the battery module 200 in the lateral direction, and the battery module 200 forming the battery pack of the vehicle may be assembled in a space formed as the side member 110, the middle member 100 and the crossing members 107 are fastened to the battery casing 300. The battery module 200 is fastened to the lateral sides of the side member 110, the middle member 100 and the crossing member, which are supporting the lateral sides of the battery module 200, and thus protected from external impact applied to the battery pack.

Furthermore, a compression pad is provided between the battery cells to compensate for a space caused by the contract and expansion of the battery cells. The plurality of battery cells are stacked and provided inside the battery module 200 in the transverse direction and may contract and expand according to external shocks or external temperature conditions.

In the instant case, the stacked and provided battery cells may be provided with the compression pad provided as a cushioning member against the contract or expansion of the battery cells, which occur in the widthwise direction of the battery cells according to external shocks or external temperature conditions, because one battery cell may affect other battery cells. The compression pad is filled in a gap between the battery cells, increasing the stability of the battery module 200, and thus increasing the stability of the battery pack itself.

Furthermore, the mounting portion 400 may be formed at a middle point of the endplate 210 with respect to the height of the battery module 200. The endplate 210 is provided at the outermost side of the battery module 200 in the width direction, and the mounting portion 400 is formed protruding outwardly from the endplate 210 and inserted in the fastening groove 120 formed in the casing member 105. To make the mounting portion 400 formed in the endplate 210 be inserted in the fastening groove 120 formed in the casing member 105, the height of the mounting portion 400 is required to correspond to the height h1 of the casing member 105. Because the endplate 210 has the same height as the battery module 200, the mounting portion 400 is formed at the middle point of the endplate 210 to be inserted in the fastening groove 120 of the casing member 105.

Furthermore, it is characterized in that the battery casing 300 includes the casing member 105 extending in the longitudinal direction thereof; the surface of the casing member 105, which faces toward the battery module 200, is in surface-contact with the endplate 210 and supports the surface pressure of the battery module 200; the casing member 105 is formed with the fastening groove 120 at the point corresponding to the mounting portion 400; the mounting portion 400 is inserted in the fastening groove 120 and fastened to the casing member 105; and the casing member 105 of the battery casing 300 is an extruding member, the section of which has a plurality of hollow portions. In general, the extruding member is made of aluminum which is easy to work and lightweight, and is internally formed with the hollow portions.

Furthermore, the plurality of hollow portions includes an upper space A and a lower space B, and the upper space A and the lower space B are divided by an intermediate wall C provided therebetween.

The side member 110 of the casing member 105 is formed with a flange 140 to be coupled to the vehicle body at the right side, and the hollow portions include the upper space A and the lower space B to divide the space. The divided spaces may be provided in parallel with the battery casing 300, the intermediate wall C may include the fastening groove 120 formed in a vertical direction, and the intermediate wall C may correspond to the mounting portion 400.

FIG. 2 is a view showing the battery module 200, and the mounting portion 400 formed in the battery module 200 in the vehicle battery pack assembly.

When the mounting portion 400 is inserted in the corresponding fastening groove 120, the mounting portion 400 may be vertically inserted in the fastening groove 120 and fastened to the casing member 105. Referring to FIG. 2, the mounting portion 400 may have a structure for supporting both the endplate 210 and the intermediate wall C when inserted in the fastening groove 120 and fastened to the casing member 105. To support both the endplate 210 and the intermediate wall C, the mounting portion 400 needs to be perpendicularly bolted to the intermediate wall C provided in parallel with the battery casing 300, and then fastened to the casing member 105. The fastening groove 120 may be formed in the side members 110 provided at the opposite lateral sides of the battery casing 300 in the longitudinal direction, the middle member 100 provided between the side members 110 in the longitudinal direction, and the crossing members 107 provided between the side member 110 and the middle member 100 in the transverse direction, which form the casing member 105.

In the instant case, the hollow portions are formed including the upper space A and the lower space B, and the intermediate wall C is a portion of the casing member 105, to which the mounting portion 400 inserted in the fastening groove 120 is fastened. In the remaining portions except for the foregoing portions, the upper space A, the lower space B and the intermediate wall C are not formed.

Furthermore, FIG. 4 is a view showing that the surface of the casing member 105, which faces the battery module 200, is in surface-contact with the endplate 210 to support the surface pressure of the battery module 200.

Referring to FIG. 4, it is characterized in that the plurality of fastening grooves 120 are formed in the casing member 105 at regular intervals, and the mounting portions 400 are respectively inserted in the fastening grooves 120 and fastened to the casing member 105. The vehicle battery pack assembly according to the present disclosure is required to include the plurality of fastening grooves 120 to form a structure for supporting the surface pressure of the large-area module from the front with the battery pack casing member 105 itself, and more strongly support the surface pressure. The fastening grooves 120 formed at the points corresponding to the mounting portions 400 are spaced apart at regular intervals for the stability and easy assembly of the battery pack. Likewise, the plurality of mounting portions 400 may be formed on the external side of the endplate 210 and spaced apart at regular intervals.

Furthermore, it is characterized in that the portion in the casing member 105, to which the mounting portion 400 inserted in the fastening groove 120 is fastened, is formed at the same height h1 as the mounting portion 400, but the portion, in which the mounting portion 400 is not inserted in the fastening groove 120 and not fastened to the casing member 105, is formed at the same height h2 as the battery module 200.

A portion to which the battery module 200 is mounted to the battery casing 300 is the portion to which the mounting portion 400 inserted in the fastening groove 120 is fastened, and therefore the casing member 105 is formed at the same height h1 as the mounting portion 400, applying the surface pressure to the battery module 200 through the mounting portion 400 and the endplate 210. Furthermore, a portion to which the battery module 200 is not mounted to the battery casing 300 is the portion in which the mounting portion 400 is not inserted in the fastening groove 120 and not fastened to the casing member 105, and therefore the casing member 105 is formed at the same height h2 as the battery module 200 and thus formed at the same height h2 as the mounting portion 400 through the endplate 210. Both the portion to which the mounting portion 400 inserted in the fastening groove 120 is fastened and the portion in which the mounting portion 400 is not inserted in the fastening groove 120 and not fastened to the casing member 105 are formed having the constant heights, forming a strong surface pressure structure in the battery module 200 using the CTP structure.

FIG. 5 and FIG. 6 are views showing a cross-section taken along line C', in which the mounting portion 400 is inserted in and fastened to the fastening groove 120 in the casing member 105, and a cross-section taken along line D', in which the mounting portion 400 is not inserted in and not fastened to the fastening groove 120. Referring to FIG. 5 and FIG. 6, the lateral surface of the lower space B is in surface-contact with the endplate 210 and supports the surface pressure of the battery module 200 in the portion of the casing member 105, to which the mounting portion 400 inserted in the fastening groove 120 is fastened, but the lateral surfaces of the upper space A and the lower space B are in surface-contact with the endplate 210 and support the surface pressure of the battery module 200 in the portion, in which the mounting portion 400 is not inserted in the fastening groove 120 and not fastened to the casing member 105.

Referring to the cross-section C' in FIG. 5, when the mounting portion 400 is inserted in and fastened to the fastening groove 120, the lower space B and the intermediate wall C are formed without the upper space A. The mounting portion 400 may be bolted to the intermediate wall C formed on the top portion of the lower space B, and the bolted mounting portion 400 may support the casing member 105 and the endplate 210, forming a strong surface pressure structure in the battery module 200. Referring to the cross-section D' in FIG. 6, the upper space A, the lower space B and the intermediate wall C are formed in the portion in which the mounting portion 400 is not inserted and not fastened to the fastening groove 120. The lower space B and the intermediate wall C are shared between the portion to which the mounting portion 400 is inserted in and fasted to the fastening groove 120 and the portion to which the mounting portion 400 is not fastened. Due to the fastening groove 120 formed in the intermediate wall C, there is a difference between the presence and absence of the upper space A. In the portion in which the left side of the flange 140 is in contact with the battery module 200, the casing member 105 for supporting the endplate 210 is formed to have the same heights h1 and h2 as that of the battery module 200 so that the battery module 200 may be designed to directly have the strong surface pressure structure, maximizing the stability.

In the vehicle battery pack assembly according to the present disclosure, the battery pack casing member 105 itself forms the structure for supporting the surface pressure of the large-area module from the front without the separate pack endplate in the battery assembly using the CTP structure to thereby strongly support the surface pressure, the use of the battery pack casing member 105 makes the battery pack assembly lightweight and reduces the costs of materials, and a battery pack itself is improved in stability.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle battery pack assembly comprising:
    a battery module including a plurality of battery cells stacked and provided in a transverse direction, and an endplate provided at an outermost side of the battery module in a width direction of the battery module and formed with a mounting portion protruding outward therefrom; and
    a battery casing provided with a casing member extending along a longitudinal direction of the battery module, the casing member, of which a surface facing toward the battery module is in surface-contact with the endplate to support a surface pressure of the battery module,
    wherein the casing member is internally divided into an upper space and a lower space by an intermediate wall,
    wherein the intermediate wall of the casing member is formed with a fastening groove at a position corresponding to the mounting portion,
    wherein an upper side of the upper space at the fastening groove is open, and
    wherein the mounting portion is inserted into the fastening groove in a vertical direction and fastened to the casing member.

2. The vehicle battery pack assembly of claim 1, further including a compression pad mounted between the battery cells to compensate for a space caused by contract and expansion of the battery cells.

3. The vehicle battery pack assembly of claim 1, wherein the casing member includes:
    side members provided at opposite sides of the battery casing in the longitudinal direction;
    a middle member provided between the side members in the longitudinal direction; and
    crossing members provided between the side members and the middle member in the transverse direction,
    wherein the battery module is provided in a lateral direction with respect to the middle member between the side members.

4. The vehicle battery pack assembly of claim 3, wherein the side members, the middle member and the crossing members support the battery module in the lateral direction.

5. The vehicle battery pack assembly of claim 1, wherein the casing member has a cross-section of which includes a plurality of hollow portions.

6. The vehicle battery pack assembly of claim 5, wherein the mounting portion supports the endplate and the intermediate wall when inserted in the fastening groove and fastened to the casing member.

7. The vehicle battery pack assembly of claim 1,
    wherein the mounting portion includes a plurality of mounting portions, and
    wherein the fastening groove includes a plurality of fastening grooves formed in the casing member and spaced apart at predetermined intervals, and the mounting portions are respectively inserted in the fastening grooves and fastened to the casing member.

8. The vehicle battery pack assembly of claim 1, wherein the mounting portion is inserted in the fastening groove and fastened to the casing member by bolting the mounting portion and the casing member.

9. The vehicle battery pack assembly of claim 1, wherein the mounting portion is formed to overlap with a middle point of the endplate with respect to a height direction of the battery module.

10. The vehicle battery pack assembly of claim 1,
    wherein a portion in the casing member, to which the mounting portion inserted in the fastening groove is fastened, is formed at a same height as the mounting portion.

11. The vehicle battery pack assembly of claim 10,
    wherein a portion in the casing member, in which the mounting portion is not inserted and fastened to the fastening groove, is formed at a same or lower height than the battery module.

12. The vehicle battery pack assembly of claim 5,
    wherein a lateral surface of the lower space is in surface-contact with the endplate and supports the surface pressure of the battery module in a portion of the casing member to which the mounting portion inserted in the fastening groove is fastened.

13. The vehicle battery pack assembly of claim 5,
    wherein lateral surfaces of the upper space and the lower space are in surface-contact with the end plate and support the surface pressure of the battery module in a portion of the casing member in which the mounting portion is not inserted in and not fastened to the fastening groove.

14. The vehicle battery pack assembly of claim 3,
    wherein the side members of the casing member are formed with a flange to be coupled to a vehicle body.

* * * * *